G. B. ADAMS.
Fountain-Pen.

No. 208,219.    Patented Sept. 24, 1878.

Witness
Horace Harris
Henry J. Pinson

Inventor
George B. Adams.

UNITED STATES PATENT OFFICE.

GEORGE B. ADAMS, OF NEWARK, NEW JERSEY.

IMPROVEMENT IN FOUNTAIN-PENS.

Specification forming part of Letters Patent No. 208,219, dated September 24, 1878; application filed March 15, 1878.

*To all whom it may concern:*

Be it known that I, GEORGE B. ADAMS, of the city of Newark, in the county of Essex and State of New Jersey, have invented certain Improvements in Fountain-Pens, the nature of which improvements consists in a force and suction arrangement for feeding the ink to the pen while in use, and in preventing the ink from flowing when not in use; and I hereby declare that the following is a full, clear, and exact description of the same, reference being had to the annexed drawings, which form a part of this specification, in which—

Figure 1:
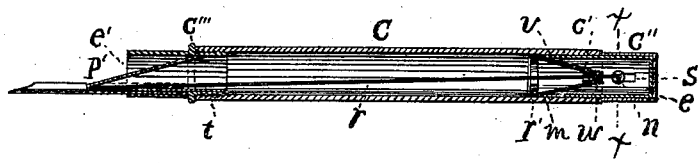
Figure 2:
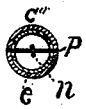

Figure 1 is a longitudinal section, and Fig. 2 a transverse section, taken in the line *x x*.

To enable those skilled in the art to which my invention relates the better to understand and construct the same, I will proceed to describe it more fully.

In Fig. 1, *c* represents a case, made of hard rubber or other suitable material, and fitted for holding ink, and, when filled, constitutes the fountain or ink-supply for the pen.

To the upper end of the case *c* there is fitted snugly a piece of metal tubing, *e*, about an inch long, more or less, which tube *e* is as large in its outside diameter as the case *c* is in its inside diameter, and the said tube *e* is snugly forced into the case *c* to the distance of half an inch, thus leaving half an inch of the tube *e* exposed above the top of the case *c*.

Through the tube *e* there are two slots, *s*, opposite to each other, and above the top of the case *c*. These slots are three-sixteenths of an inch, more or less, in length, and wide enough to allow a pin to pass through, as shown at P, Fig. 2.

Through the entire length of the case *c* there is a small rod, *r*, on the upper end of which there is an eye, *n*. Just below the said eye a short distance there is secured a small collar, *c'*. Between the collar *c'* and eye *n* there is secured to the rod *r*, by wiring or otherwise, as shown at *w*, a short piece of rubber tubing, (indicated by the heavy diverging lines *v*.) The lower end of the said rubber tubing is stretched over a ring, *r'*, of inelastic substance, which ring is sufficiently large in its outside diameter to snugly press the rubber to the inside of the case *c*.

When the rubber tubing has been secured to the rod *r*, the said rod, with the tubing and its ring *r'*, is passed into the case *c* at its lower end, forced upward until the rubber tubing just above the ring *r'* comes in contact with the inner metal tube, *e*, as shown at *m*, and just before the eye *n* reaches the slots *s*, and there the ring *r* and rubber tube are held in a fixed position, while the rod *r*, with its eye *n*, is forced still upward until the said eye comes in line with the slots *s*, when the pin P, shown in Fig. 2, is passed through and secures the whole in place.

Outside and covering that part of the tube *e* which extends above the case *c* is a cap, *c''*, fitting loosely, and to which the pin P is securely fastened, the object of this cap *c''* being to furnish a finger-hold for replenishing the pen with ink, as will be hereinafter more fully shown.

To the end of the case *c* there is fitted by threading, as shown at *t*, a short piece of hard-rubber tube, *e'*, provided with a milled collar, *c'''*, to prevent leakage, as well as for finish and convenience in screwing it to and for replenishing the fountain.

Within the tube *e'* is fitted air-tight a secondary tube, tapering downward to a point, as shown at P'. This tube is made of silver or any material that will not corrode, and is inclined to one side, so as to come nearly or quite in contact with the pen. This arrangement, by the increased attraction occasioned thereby, enables the pen to hold more ink without dropping than it otherwise would do. Within this tube P' the rod *r*, at its extreme lower end, fits as a valve or plunger, closing perfectly tight the small orifice in the tube P'.

When the pen is to be filled for use the rod *r* is drawn back to the limit of the slots *s*, thus admitting air at the point of the tube P', and drawing it in by suction occasioned by elongating the rubber tube *v*. In withdrawing the rod *r* when the cap *c''* is released, the rubber tube *v*, acting as a spring, forces the rod *r* downward, carrying with and before it the necessary amount of ink, and instantly closing the orifice in the point of the tube P', thus effectually preventing the flow of any more ink until the operation of withdrawing the rod is again repeated. The point of the rod *r* is made of silver or platinum to prevent corrosion.

Outside of the tube $e'$, and below the collar $c'''$, is a metallic covering, which serves as a finish, and also to hold the pen.

I do not claim the rod $r$, nor tapering tube at the lower end of the case $c$, for I am aware that such device has been in use for some time; but,

Having thus described my invention, what I do claim in a fountain-pen, and desire to secure by Letters Patent, is—

The tubular rubber spring $v$, ring $r'$, and actuating-cap $c''$, in combination with the rod $r$ and tapering tubular point $P'$, substantially as shown and described.

GEORGE B. ADAMS.

Witnesses:
HORACE HARRIS,
HENRY J. PIERSON.